United States Patent [19]

Kim et al.

[11] Patent Number: 5,428,462
[45] Date of Patent: Jun. 27, 1995

[54] FACSIMILE APPARATUS HAVING USER NAME REGISTER WITH MEANS FOR RECEIVING IMAGE SIGNALS AND FOR COMPRESSING AND STORING SAME SO AS TO PRINT IDENTIFIER, LOGO OR TRADEMARK OF SENDER WITH REDUCED STORAGE MEANS

[75] Inventors: Yong J. Kim, Seoul; Jeong Y. Kim, Anyang-City, both of Rep. of Korea

[73] Assignee: Goldstar Col, Ltd., Seoul, Rep. of Korea

[21] Appl. No.: 893,546

[22] Filed: Jun. 4, 1992

[30] Foreign Application Priority Data

Jun. 4, 1992 [KR] Rep. of Korea ............... 91-9245

[51] Int. Cl.$^6$ .................. H04N 1/21; H04N 1/40; G06F 15/70
[52] U.S. Cl. .................. 358/462; 358/468; 358/444; 382/317; 382/1; 395/110; 395/115
[58] Field of Search ............... 382/9, 69, 61; 358/434, 358/440, 462, 468; 395/110, 114, 115–116

[56] References Cited

U.S. PATENT DOCUMENTS

| | | | |
|---|---|---|---|
| 4,566,039 | 1/1986 | Oya | 358/462 |
| 4,566,127 | 1/1986 | Sekiya et al. | 358/462 |
| 4,881,180 | 11/1989 | Nishiyama | 395/110 |
| 5,003,614 | 3/1991 | Tanaka et al. | 382/18 |
| 5,047,955 | 9/1991 | Shope et al. | 395/116 |
| 5,099,340 | 3/1992 | Kamada et al. | 358/434 |

Primary Examiner—Scott A. Rogers

[57] ABSTRACT

User identification name register method and device in a facsimile, capable of performing a compression coding of image signals recorded in a card for a user identification name register and transmitting the image signals as a facsimile header, thereby freely registering, as the sender identification name, not only fonts stored in a font ROM, but also any types of characters and designs which the user desires to register, so that the number of fonts stored in a font ROM is minimize.

5 Claims, 8 Drawing Sheets

*FIG. 1*

(Prior Art)

-- HOME FAX REG. TABLE --

(1) NON-CALL / CALL INCOMING    ■ NO      □ YES
(2) REC. START CALLS IN AUTO-REC.    □ 2 TIMES  ■ 6 TIMES
(3) TEL/FAX AUTO-SWITCHING    □ NO      □ YES
(4) TEL CALLS IN TEL/FAX AUTO-SW.    ■ 5 TIMES  □ 10 TIMES
(5) COM. REPORT PRINTING    □ NO      □ YES
(6) SWITCHING TO AUTO-REC. MODE    □ NO      ■ SW. 6 TIMES
(7) REMOTE REC. NO.

0 1 2 3 4 5 6 7 8 9
    □ □ □ □ □ □ □ □ □ □

(8) SENDER'S TEL NO.

0 1 2 3 4 5 6 7 8 9    0 1 2 3 4 5 6 7 8 9
  □ □ □ □ □ ■ □ □ □ □    □ □ □ □ □ □ □ □ □ □
  □ □ □ □ □ □ □ ■ □ □    □ □ □ □ □ □ □ □ □ □
  □ □ □ □ □ ■ □ □ □ □    □ □ □ □ □ □ □ □ □ □
  □ □ □ □ □ □ □ ■ □ □    □ □ □ □ □ □ □ □ □ □
  □ □ □ ■ □ □ □ □ □ □    □ □ □ □ □ □ □ □ □ □
  □ □ □ □ ■ □ □ □ □ □    □ □ □ □ □ □ □ □ □ □
  □ □ □ ■ □ □ □ □ □ □    □ □ □ □ □ □ □ □ □ □
  □ □ □ □ □ □ □ □ □ □    □ □ □ □ □ □ □ □ □ □
  □ □ □ □ □ □ □ □ □ □    □ □ □ □ □ □ □ □ □ □
  □ □ □ □ □ □ □ □ □ □    □ □ □ □ □ □ □ □ □ □

(9) SENDER'S NAME

GoldStar ®
GOLDSTAR CO., LTD.

GOLDSTAR CO.,LTD.                FAX : 5758353        P.01

GoldStar®            F A X

5   PAGE
DOCKET NO.:              | SEC. | CHARGE | MANAGER | DIRECTOR |
RECEIVER: Korea Morex    | REC. |        |         |          |
REF.: Seung Kwan Kim     | TRAN.|        |         |          |
SENDER: G.S. H.E. 8th Chamber    DATE:
SUBJECT: Sample Request          NAME: TAE HO KHO    TEL : 575-5811
                                                         ex) 4214

Gentlemen,
We request the following samples. Please inform us of the cost.
With best regards, — Following —

1. Sample Request

| NO. | Part Number   | Part Name     | Quantity |
|-----|---------------|---------------|----------|
| 1   | 52080 – 2010  | FPC Connector | 10 EA    |
| 2   | 52080 – 2210  | FPC Connector | 10 EA    |
| 3   | 5597 – 20APB  | FPC Connector | 10 EA    |
| 4   | 5597 – 22APB  | FPC Connector | 10 EA    |
| 5   | 20782-20-200A | Flex Jumper   | 10 EA    |

FIG. 5b

金 洛 俊   FAX : 8713746   P.01

FIG. 5c

Thanks for your continued cooperation   — GOLD BAKERY —   FAX : 28927   P.01

FACSIMILE APPARATUS HAVING USER NAME REGISTER WITH MEANS FOR RECEIVING IMAGE SIGNALS AND FOR COMPRESSING AND STORING SAME SO AS TO PRINT IDENTIFIER, LOGO OR TRADEMARK OF SENDER WITH REDUCED STORAGE MEANS

BACKGROUND OF THE INVENTION

1. Field of the Invention

The present invention relates to a user identification name register method and device in a facsimile, and more particularly to a user identification name register method and device in a facsimile which makes it possible for the user to register optional characters and designs, such as the sender identification name, irrespective of their types.

2. Description of the Prior Art

Currently, general facsimiles adopt two user identification name register methods. One method is a register method using a key manipulation, while the other method is a register method using an optical mark reader (OMR) card.

Facsimiles equipped with liquid crystal displays (LCDs) mainly use the first method using the key manipulation. According to this method, the user can achieve a user identification name register by manipulating input keys while viewing the registered content displayed on an LCD. In facsimiles having no LCD, such a register using the key manipulation may be also used. In this case, the user can confirm the registered content by printing it on a recording sheet. However, it is troublesome for the user to confirm the registered content in detail. In the register by the user, it is also impossible to check the inputted content in detail. Accordingly, there is a problem that the user makes a mistake frequently.

Even in cases of facsimiles having LCDs, characters and symbols stored in a font RON can be registered only. As a result, it is impossible for the user to freely register and use desired characters and designs such as his logogram and trademark.

On the other hand, the other method using an OMR card is a user identification name register method of marking or writing, in an OMR card, font codes for the name of sender, codes for the telephone number and other items to be registered, and reading the content written in the OMR card by a scanner equipped in a facsimile. Most of facsimiles utilizing this user identification name register method using the OMR card have no display device such as an LCD. The method has an advantage of avoiding any possibility for the user to make a mistake, as compared with the method using a key manipulation.

Figure 1:
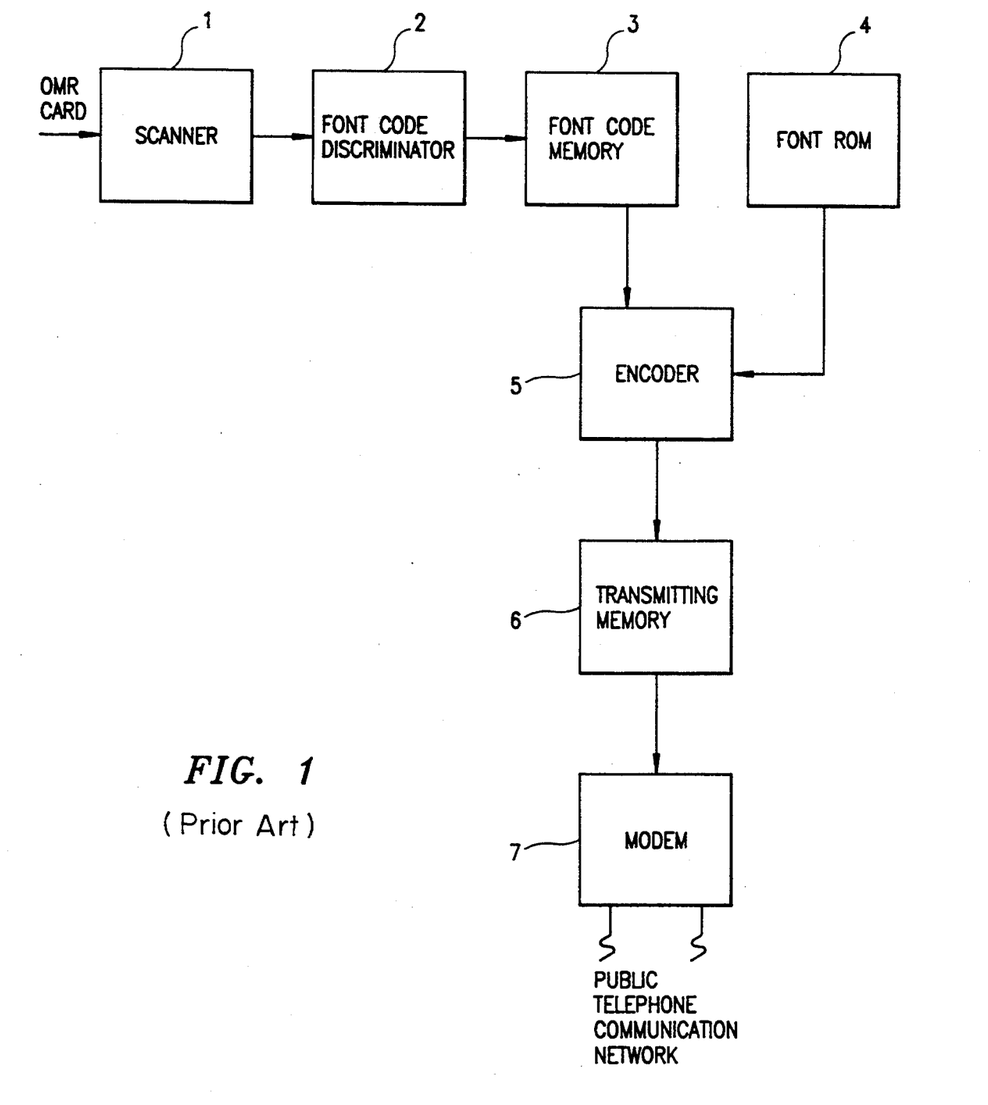
FIG. 1 is a block diagram of a conventional facsimile user identification name register device.

Referring to FIG. 1, there is illustrated a block diagram of a typical facsimile adopting the user identification name register method using an OMR card.

As shown in FIG. 1, the facsimile comprises a scanner 1 disposed at a reading station of the facsimile and adapted to read an OMR card loaded on the reading station. In the OMR card, items to be registered my include the sender identification name, namely, a header which has been written by the user. The scanner 1 is a contact image sensor (CIS) which is used for reading and writing a document in facsimile.

A font code discriminator 2 discriminates font codes written in the OMR card on the basis of images read by the scanner 1. The discriminated font codes are then stored in a font code memory 3. Thus, the register of sender identification name is completed.

When a document is transmitted by the facsimile, accordingly, the sender identification name stored in the font code memory 3 is used to make up a transmitting header. Thereafter, a font ROM 4 reads fonts corresponding to respective font codes of the registered sender identification name and combines them. The combined fonts are received in an encoder 5 which performs a compression coding such as a modified Huffman (MH) coding, to compress font data corresponding to the facsimile header. Subsequently, the header, compression-coded by the encoder 5, is received and stored in a transmitting memory 6. Prior to transmission of the content of the document, the header from the transmitting memory 6 is transmitted to a public telephone communication network via a modulator-demodulator (modem) 7.

In such a facsimile, however, the font ROM 4 should store characters and designs required for making up the header therein. For registering the sender identification name by using various characters and designs, the font ROM 4 inevitably increases in capacity. However, such an increase is limited because it increases unreasonably the manufacture cost of font ROM, thereby avoiding the user from registering various desired characters and designs.

For this reason, current facsimiles use only fonts for simple characters such as the Roman alphabet and the Japanese characters, as it is. The Chinese characters being an ideogram and the Korean characters being combination type characters require a great many fonts corresponding to respective characters thereof. As a result, it is impossible to register the sender identification name by using such characters. Similarly, it is also impossible to register specific characters and designs which the user desires.

SUMMARY OF THE INVENTION

Therefore, an object of the invention is to eliminate the above-mentioned disadvantages encountered in the prior art and to provide a user identification name register method and device in a facsimile which is capable of registering any types of characters and designs desired by the user as the sender identification name.

Another object of the invention is to provide a user identification name register method and device in a facsimile which is capable of directly reading characters and designs for a sender identification name register as images, thereby minimizing the number of fonts stored in a font ROM.

A further object of the invention is to provide a user identification name register method and device in a which is capable of freely registering, as the sender identification name, not only fonts stored in a font ROM, but also items which the user desires to register.

In one aspect, the present invention provides a user identification name register device in a facsimile comprising: document recognizing means for recognizing a content described in input means used for a user identification name register; font code discriminating means for receiving an output, in the form of font codes, from said document recognizing means and recognizing said font codes; image signal discriminating means for receiving another output, in the form of image signals, from the document recognizing means, compressing and storing said image signals; and transmitting means for transmitting said content recognized by said font code discriminating means and said image signal discriminating means.

In another aspect, the present invention also provides a user identification name register method in a facsimile comprising the steps of: determining whether a document sent to a document recognizing means is a document for a user identification name register; recognizing font codes corresponding to facsimile function selection items and registering said facsimile function selection items; recognizing a data marking condition for a sender's telephone number and registering said sender's telephone number; and recognizing, in the form of image signals, a content which the user desires to register and registering said content.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENT

Figure 2:
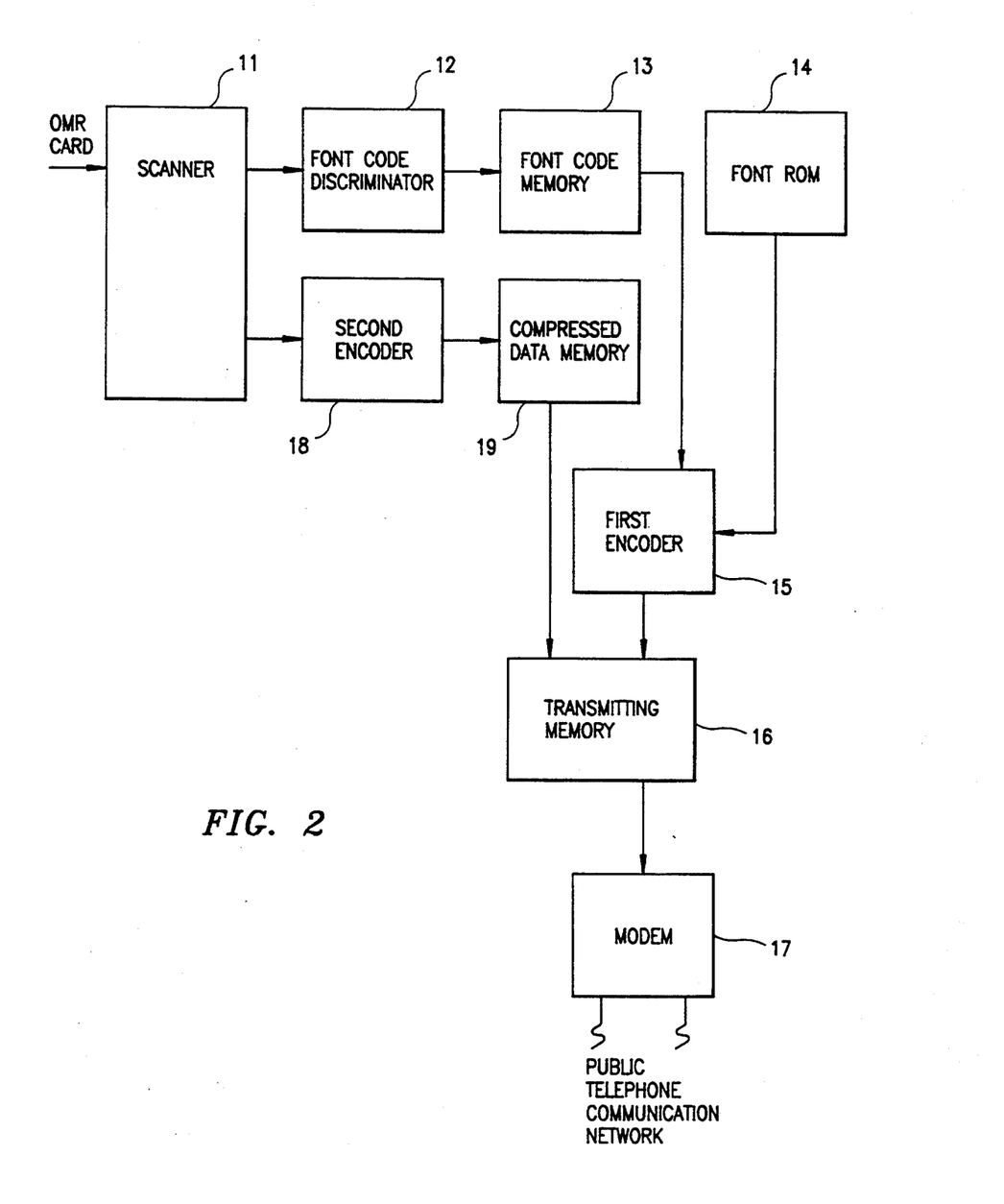
FIG. 2 is a block diagram of a facsimile user identification name register device in accordance with the present invention.

FIG. 2 is a block diagram of a user identification name register device in a facsimile in an embodiment of the present invention. As shown in FIG. 2, the user identification name register device comprises a scanner 11 for scanning font codes and images marked on an OMR card and converting the scanned images into electric signals, a font code discriminator 12 for discriminating the font codes from data sent from the scanner 11 thereon, and a font code memory 13 for receiving font code data from the font code discriminator 12 and registering it as the sender identification name. The user identification name register device also comprises a font ROM 14 in which respective fonts corresponding to the font codes are stored. Further, the user identification name register device comprises a first encoder 15 for reading respective fonts corresponding the font codes in a transmitting mode and combining the read fonts to generate encoded font data, a second encoder 18 for receiving from the scanner 11 image data corresponding to characters and/or designs described in a sender's name column of the OMR card and performing a data compression coding such as the MH coding to generate compressed data, and a compressed data memory 19 for storing encoded image data from the second encoder 18 therein, There is also provided a transmitting memory 16 which receives from the first encoder 15 the fonts corresponding to the font codes written in the OMR card and from the compressed data memory 19 the image data corresponding to the images marked on the OMR care and stores them therein. To the transmitting memory 16, a modem 17 is connected which modulates signals from the transmitting memory 16 corresponding to the header and transmits them to a public telephone communication network.

Figure 4A:
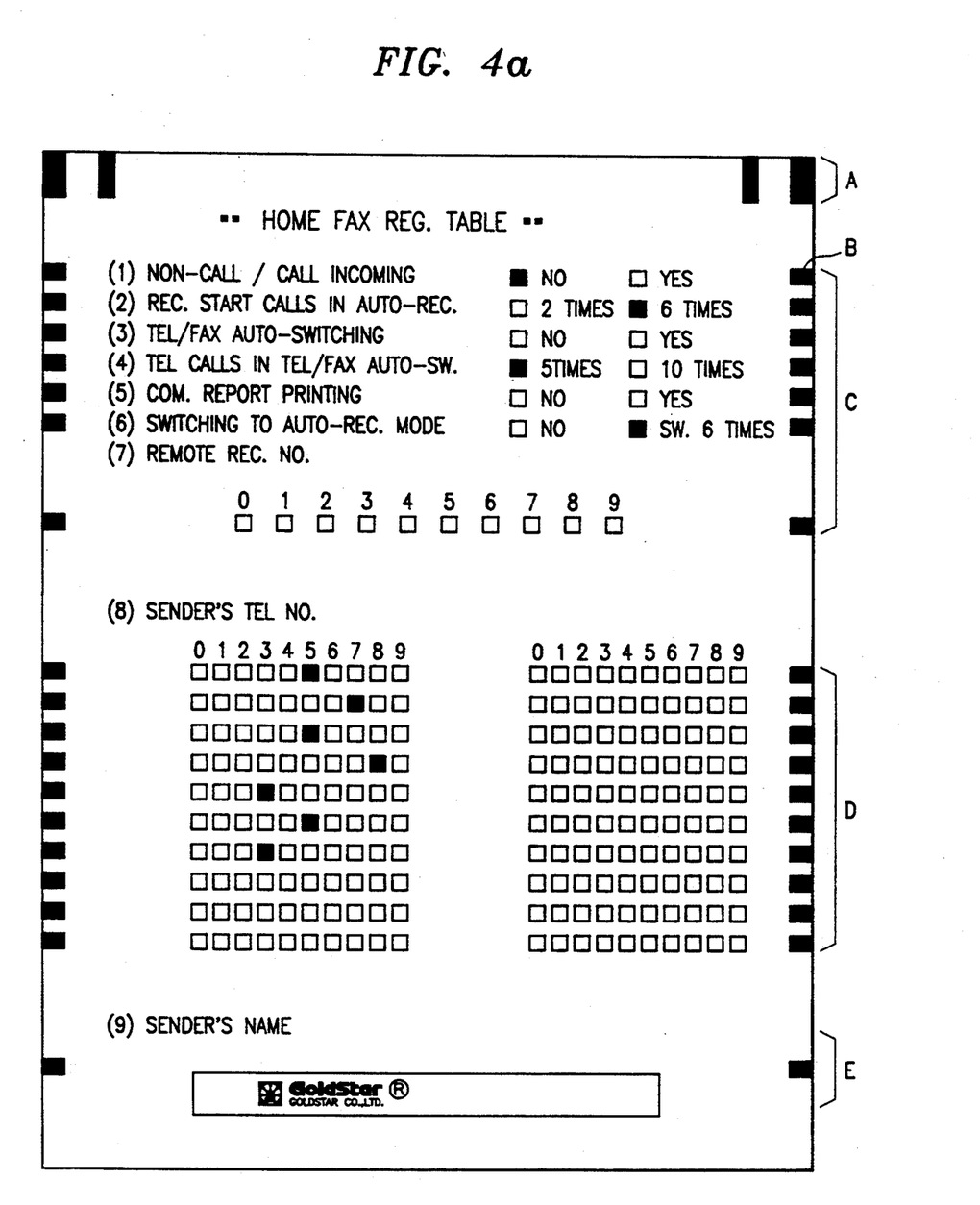
FIGS. 4a to 4c are schematic views illustrating various examples of making up OMR cards, respectively.

Referring to FIG. 4a, there is illustrated an example of OMR card for the user identification name register, which is used in the present invention. The user performs the user identification name register by using such an OMR card of the type shown in the drawing or other types of OMR cards usable for selecting functions identical to those contained in the OMR card. Herein, "the user identification name register" means both the sender identification name register and the function selection register. Also, "the sender identification name" includes the sender's name, the sender's telephone number and etc. to be printed on the upper end of a document copy, that is, the header.

For the user identification name register, first, the user marks the function selection and the sender's telephone number on the OMR card shown in FIG. 4a. The user also describes characters and/or designs to be registered, in the column of a "sender's name" item located at the lower portion of the OMR card. The OMR card is then loaded on a document reading station of the facsimile so that a CIS of the facsimile, that is, the scanner 11 can recognize the font codes and characters and/or designs marked on the OMR card.

Accordingly, the scanner 11 recognizes the OMR card, based on an OMR card identification mark A located at the upper end of OMR card. Then, the scanner 11 reads sequentially the user's function selection items in a region denoted by the reference numeral C, the sender's telephone number in a region denoted by the reference numeral D and the sender's name in a region denoted by the reference numeral E. In FIG. 4a, the reference letter B denotes each data position mark. After reading, the scanner 11 sends only the image data corresponding to the sender's name E to the second encoder 18, while sending other data, namely, font code data to the font code discriminator 12.

Figure 3A:
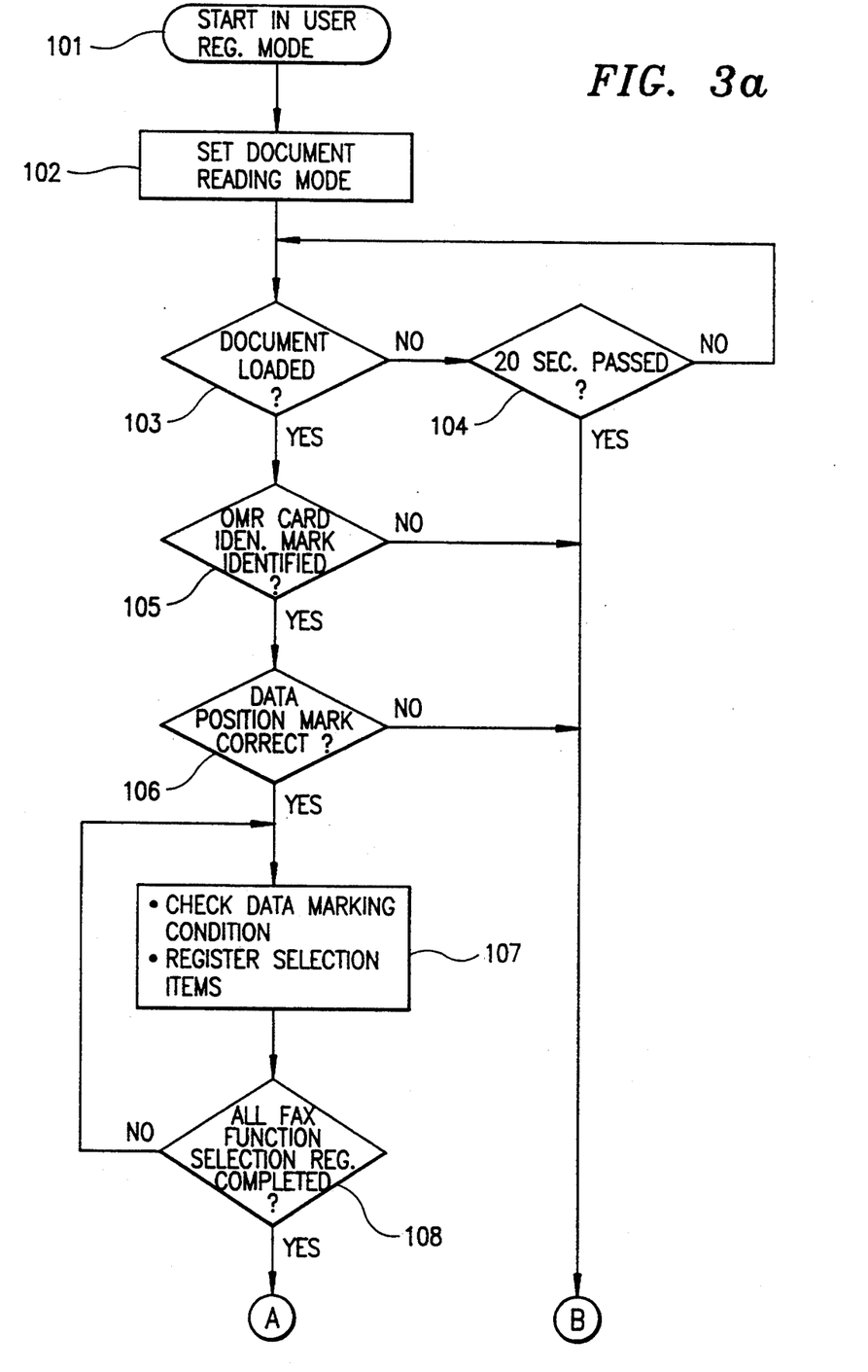
FIGS. 3a and 3b are flowcharts of an operation of registering the user identification name in accordance with the present invention.
Figure 3B:
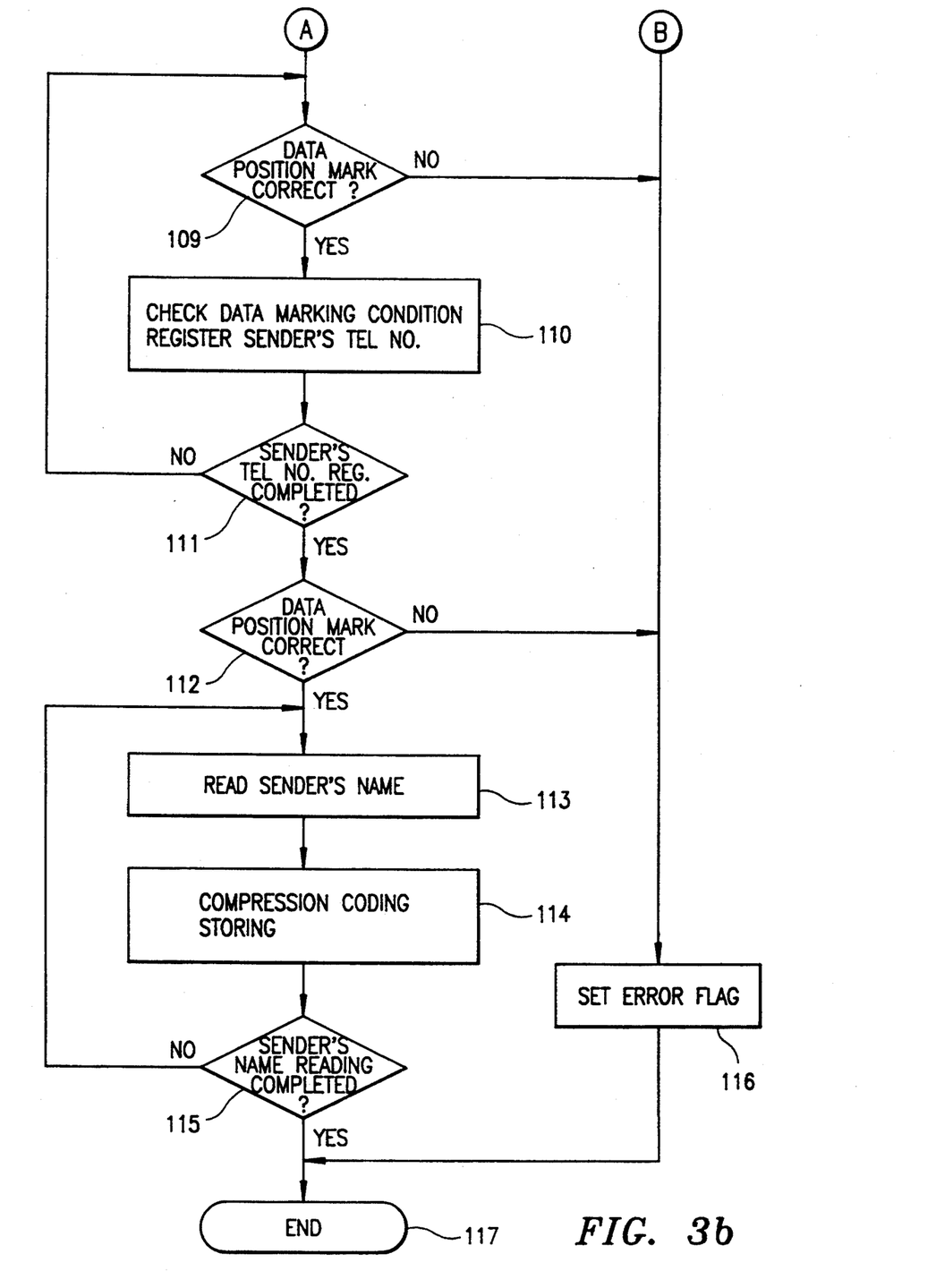

FIGS. 3a and 3b illustrate an operation of recognizing the font codes and the sender's name written in the OMR card in the facsimile.

As shown in FIG. 3a, the operation of the facsimile in a user identification name register mode commences at step 101. At step 102, the facsimile is set to operate in a document reading mode. Thereafter, at step 103, a determination is made, for example, by a document leading edge sensor whether loading of a document has been completed. If it is determined at step 104 that the loading of document is not completed after a limited time (for example, 20 seconds), an error flag is set at step 116 and the operation is completed.

In case that the loading of document has been completed, the operation proceeds to step 105 at which the scanner 11 identifies the OMR card identification mark A located on the upper end of OMR card. Thereafter, if it is determined at step 106 that data position marks are correct, the operation proceeds to step 107. At step 107, the scanner 11 reads sequentially the first to seventh function selection items written in the OMR card, that is, (1) non-call/call incoming, (2) the number of reception start calls in auto-reception, (3) telephone/facsimile auto-switching, (4) the number of telephone calls in telephone/facsimile auto-switching, (5) printing of a communication report, (6) switching to automatic receiving mode in manual reception and (7) remote reception number. The scanner 11 then registers the function selection items. Thereafter, a determination is made at step 108 whether all function selection items have been registered.

If the register has been completed, the operation proceeds to step 110, after a determination is made at step 109 that data position marks are correct, as shown in FIG. 3b. At step 110, the scanner 11 reads sequentially the item (8) sender's telephone number by the lines and then registers it. Subsequently, a determination is made at step 111 whether the register of sender's telephone number has been completed.

Figure 4B:
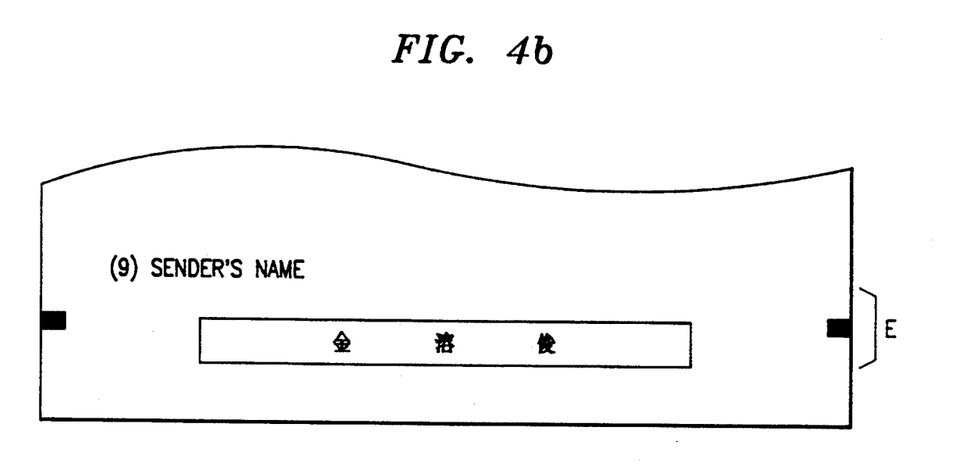
Figure 4C:
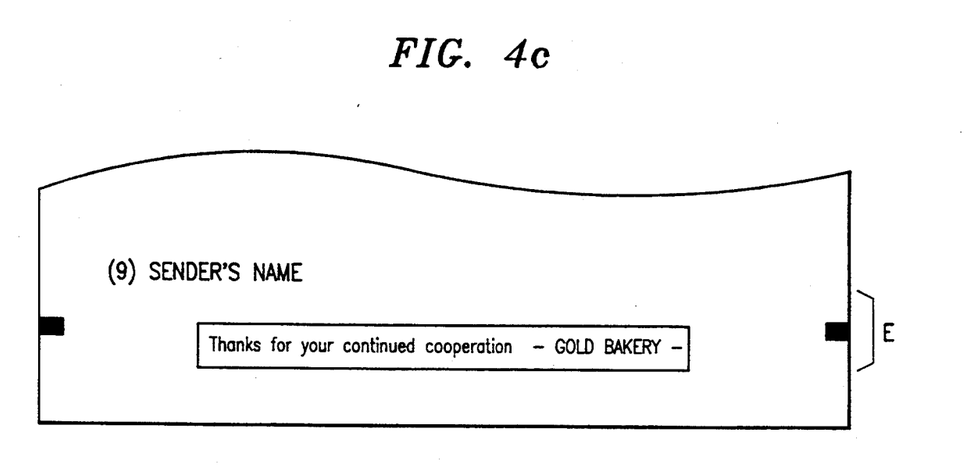

When the register has been completed, the operation proceeds to step 113, following step 112 at which a determination is made whether data position marks are correct. At step 113, the scanner 11 scans specific characters and/or designs described in the column of the item (9) sender's name, which the user desires to register. FIG. 4a shows the case where a design is described which is the name "GOLDSTAR CO., LTD." and its trademark. In case of FIG. 4b, Chinese characters are described. On the other hand, FIG. 4c shows the case where a sentence is described with slightly dense characters. The scanner 11 then sends image data corresponding to the scanned sender's name to the second encoder 18. At step 114, the second encoder 18 performs a compression coding of the received image data to generate compressed data which is, in turn, stored in the compressed data memory 19. In this case, the compression coding is achieved preferably by using the MH coding scheme providing the highest data compression ratio. Of course, other coding methods may be used. If it is determined at step 115 that the reading of sender's name has been completed, the operation is completed at step 117.

In accordance with the above-mentioned operation, the function selection items C, the sender's telephone number D and the sender's name E are registered in the font code memory 13 and the compressed data memory 19.

In the transmitting mode, these registered items are stored in the transmitting memory 16. That is, the first encoder 15 reads the fonts corresponding to the font codes stored in the font code memory 13 out of the font ROM 14. The first encoder 15 performs a compression coding of the read font data using a compressure coding method such as the MH coding method and then sends the compressed font data to the transmitting memory 16. Accordingly, the compressed font data is stored in the transmitting memory 16. The data which corresponds to the characters and/or designs described in row (9) sender's name which has been stored in the form of compressed data in the compressed data memory 19 is also stored in the transmitting memory 16. These data are modulated by the modem 17 connected to the transmitting memory 16, prior to transmission, and then transmitted over the public telephone communication network.

Figure 5A:
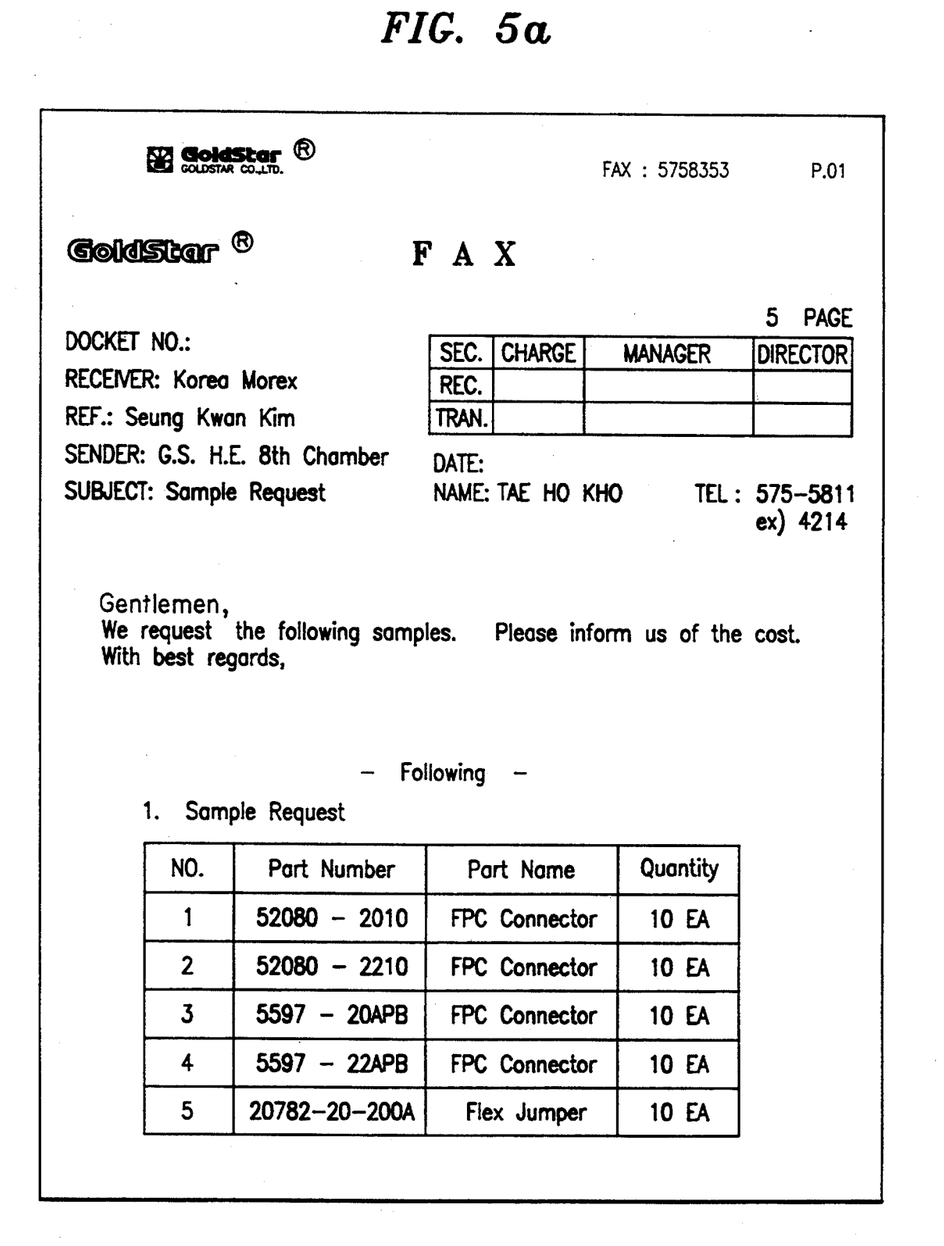
FIGS. 5a to 5c are schematic views illustrating various examples of headers outputted as the sender identification name registered in accordance with the present invention, respectively.
Figure 5B:
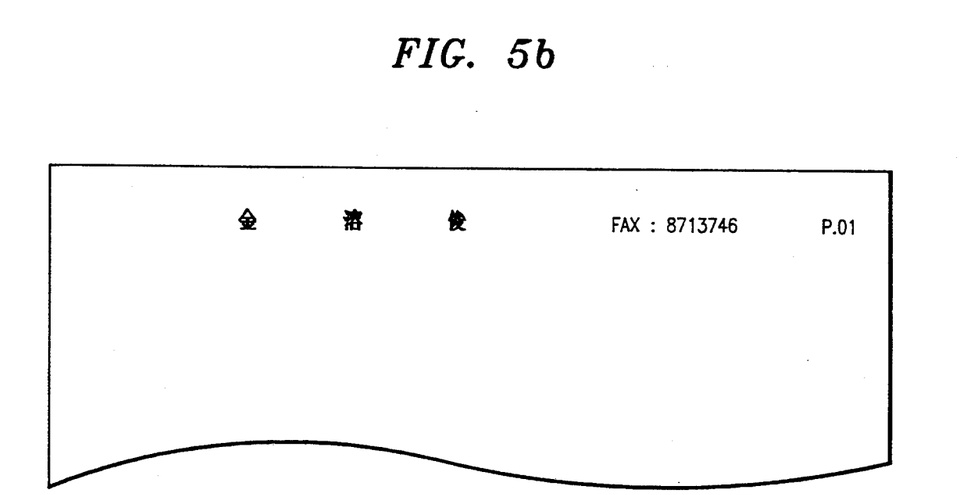
Figure 5C:
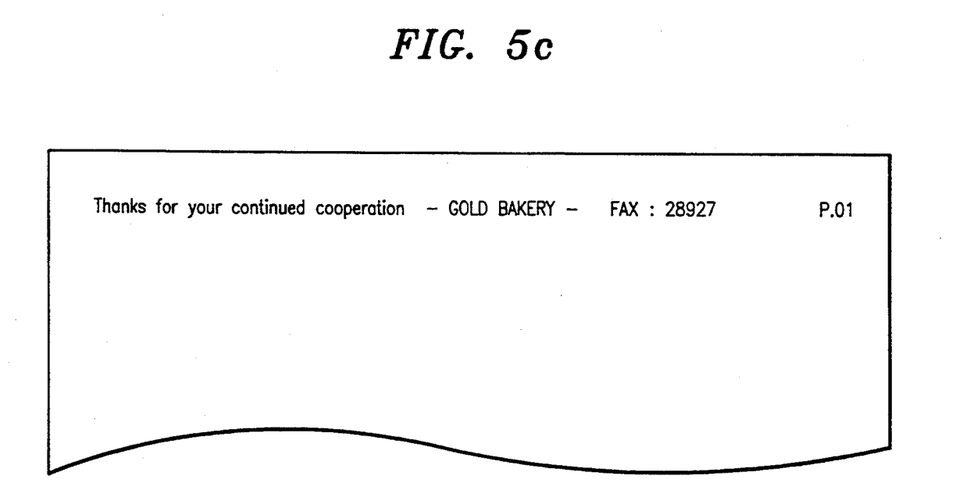

At the counterpart, namely, the receiving-side, accordingly, the sender's telephone number and name as the header are printed on the upper end of a document copy, before the content of a document original is received.

various types of the header described in the upper portion of document copy are illustrated in FIGS. 5a to 5c. FIGS. 5a to 5c shows respective header types made of a design, the Chinese characters and a sentence of dense characters.

As apparent from the above description, the present invention provides a user identification name register method and device in a facsimile, capable of freely registering specific characters and designs which the user desires by using an OMR card which is used for a register of facsimile function selection and sender's telephone number. Accordingly, there is an advantage of reducing the number of fonts stored in a font ROM.

What is claimed is:

1. In a user identification name register device of a facsimile apparatus wherein the name register device includes:
    document recognizing means for recognizing information input from an input means as a user identification name register and
    font code discriminating means for receiving an output, in the form of font codes, from said document recognizing means and recognizing said font codes, the improvement of said name register device further comprising:
    image signal discriminating means for receiving another output, in the form of image signals of a sender's name column of an optical mark reader card from the document recognizing means and for compressing and storing said image signals; and
    transmitting means for transmitting said information recognized by said font code discriminating means and said image signal discriminating means.

2. A user identification name register device in a facsimile according to claim 1, wherein said font code discriminating means further comprises:
    font code storing means for storing said font codes recognized by said font code discriminating means;
    font storage means in which fonts corresponding to font codes are stored;
    first encoding means for extracting fonts corresponding to the font codes stored in said font code storing means and performing a compression coding of data of said extracted fonts.

3. A user identification name register device in a facsimile according to claim 1, wherein said image signal discriminating means comprises:
    second encoding means for performing a compression coding of said image signals recognized by said document recognizing means; and
    compressed data storing means for storing image signals compressed by said second encoding means.

4. A user identification name register device in a facsimile according to claim 1, wherein said transmitting means comprises:
    transmitting memory means for receiving said user identification name register content from said font code discriminating means and said image signal discriminating means; and
    modulating/demodulating means for receiving the user identification name register content from said transmitting memory means and modulating it prior to transmission thereof.

5. A user identification name register method for use in a facsimile comprising the steps of:
    determining whether a document sent to a document recognizing means is a document for a user identification name register;
    recognizing font codes corresponding to facsimile function selection items and registering said facsimile function section items;
    recognizing a data marking condition for a sender's telephone number and registering said sender's telephone number; and
    recognizing, in the form of image signals, a content which the user desires to register and registering said content.

* * * * *